US006771261B2

(12) United States Patent
MacPherson

(10) Patent No.: US 6,771,261 B2
(45) Date of Patent: Aug. 3, 2004

(54) ERROR METRIC FOR MESH SIMPLIFICATION PROCESSING

(75) Inventor: Mike B. MacPherson, Portland, OR (US)

(73) Assignee: Intel Corporation, Santa Clara, CA (US)

(*) Notice: Subject to any disclaimer, the term of this patent is extended or adjusted under 35 U.S.C. 154(b) by 568 days.

(21) Appl. No.: 09/944,253

(22) Filed: Aug. 30, 2001

(65) Prior Publication Data

US 2003/0046617 A1 Mar. 6, 2003

(51) Int. Cl.⁷ .............................................. G06T 17/00
(52) U.S. Cl. ....................................................... 345/420
(58) Field of Search ........................................ 345/420

(56) References Cited

U.S. PATENT DOCUMENTS 6,630,932 B1 * 10/2003 Grzeszczuk ................. 345/420

OTHER PUBLICATIONS

Garland et al., "Simplifying Surfaces with Color and Texture Using Quadric Error Metrics," SIGGRAPH 1997 Proceedings, Aug. 1997, pp. 209–216.*

Hugues Hoppe, "View–Dependent Refinement of Progressive Meshes", Proceedings of SIGGRAPH, ACM SIGGRAPH Aug. 1997, Computer Graphics Proceedings, Annual Conference Series, pp. 189–197, ACM Press.

Peter Lindstrom, Greg Turk, "Fast and Memory Efficient Polygonal Simplification", IEEE, Visualization 1998 Proceedings, 1998, pp. 279–286.

Paul S. Heckbert, Michael Garland, "Survey of Polygonal Surface Simplification Algorithms", SIGGRAPH 1997, 1997, pp. 1–29.

Michael Garland, Paul S. Heckbert, "Surface Simplification Using Quadric Error Metrics", SIGGRAPH 1997 Proceedings, Aug. 1997, pp. 209–216.

Michael Garland, Paul S. Heckbert, "Simplifying Surfaces with Color and Texture using Quadric Error Metrics", Visualization 1998 Proceedings, pp. 263–269.

* cited by examiner

Primary Examiner—Mark Zimmerman
Assistant Examiner—Lance W. Sealey
(74) Attorney, Agent, or Firm—Steven P. Skabrat

(57) ABSTRACT

Generating a modified mesh by simplifying an original mesh representing a scene or object is achieved by collapsing edges of the original mesh in an order defined by an error metric to produce the modified mesh. Determining the error metric includes selecting an edge of the mesh, performing an edge collapse operation for the selected edge, computing at least one distance from a plane of each updated face of the mesh to a position of a vertex removed during the edge collapse operation, selecting a maximum distance of the computed distances as the error metric for the edge collapse operation for the selected edge, and restoring the collapsed edge to the mesh.

20 Claims, 3 Drawing Sheets

ERROR METRIC FOR MESH SIMPLIFICATION PROCESSING

BACKGROUND

1. Field

The present invention relates generally to computer graphics and, more specifically, to mesh simplification of multi-resolution models.

2. Description

In computer graphics, a model is a structured digital representation of an object or scene. Many computer graphics applications employ complex, detailed models of scenes or objects to maintain a convincing level of realism for a user. Consequently, models are often created or acquired at a resolution to accommodate this desire for detail. However, depending on the application, this complexity of such models may be excessive, and since the computational cost of using a model is typically related to its complexity, it is often useful to have simpler versions of complex models. Hence, methods of automatically and efficiently producing simplified models are desirable.

A goal of multi-resolution modeling is to extract the details from complex models that are desirable for rendering a scene and to remove other, excessive details. A multi-resolution model is a model which captures a wide range of levels of detail of an object and which can be used to reconstruct any one of those levels. Such models are typically represented as a mesh of many triangles, each triangle having three vertices and three edges. A mesh may be represented by a data structure stored in a data storage device. One area of research in multi-resolution modeling has been the development of iterative edge contraction techniques. An edge contraction (also known as an edge collapse) takes the two endpoints (vertices) of a target edge within a mesh, moves them to a single position, links all incident edges to one of the vertices of the mesh at the position, deletes the other vertex, and removes any faces that have degenerated into lines or points. Typically, this removes two triangular faces per edge contraction, thereby simplifying the model. Edge contraction processes work by iteratively contracting edges of the mesh until a desired resolution is achieved. Differences in such processes lie primarily in how a particular edge to be contracted is chosen.

Surface simplification is a restricted form of edge contraction in multi-resolution modeling. In polygonal surface simplification, a goal is to take a polygonal model as input data and generate a simplified model (e.g., an approximation of the original) as output data. The focus of such simplification is on polygonal models represented as meshes comprising only triangles (e.g., wire frame models). This implies no loss of generality, because every polygon in an original model can be triangulated as part of a pre-processing phase.

Simplification is useful in order to make storage, transmission, computation, and display of models more efficient. A compact approximation of a model can reduce disk and memory utilization and can speed network transmission. It can also accelerate a number of computations involving shape information, such as finite element analysis, collision detection, visibility testing, shape recognition, and display. In sum, reducing the number of polygons in a model can make the difference between slow display and real time display.

BRIEF DESCRIPTION OF THE DRAWINGS

The features and advantages of the present invention will become apparent from the following detailed description of the present invention in which.

DETAILED DESCRIPTION

Figure 1:
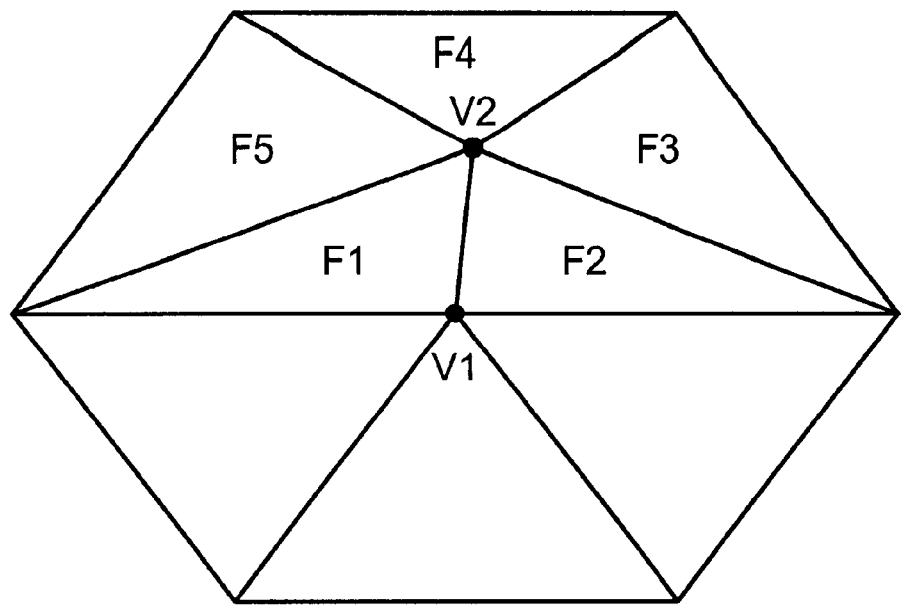
FIG. 1 is a diagram of an example mesh prior to an edge collapse operation.

An embodiment of the present invention is a method of determining an error metric used in generating simplified versions of models represented as meshes. In particular, an embodiment comprises an improvement in the error metric component of existing mesh generation processes. Embodiments of the present invention use an error metric to efficiently determine which vertices are lesser important vertices to the shape of a mesh for purposes of mesh simplification. As used herein, a metric is a process for determining vertices of a mesh, that, when removed from a mesh, cause a reduced amount of damage visually to the shape of the model in comparison with removal of other vertices. The edges affected by these vertices are iteratively removed one at a time from the mesh to produce a series of models from the original, greater complexity mesh to a lesser complexity mesh. A mesh simplification system ranks all of the possible mesh simplification steps with the error metric and then performs them in order of least damaging to most damaging. Since the iterative edge contraction process generates a series of models, a user may adjust the resolution of any generated mesh. The meshes may be stored for future use at any point in the iterative edge contraction process, thereby making available models with different levels of detail. In one embodiment, the meshes are view dependent adaptive meshes and the mesh simplification system comprises a view dependent adaptive mesh simplification system.

A model may be obtained from a variety of sources such as digital image scanners, authoring tools, digital cameras, and so on. The model may then be processed into a wire frame mesh format. Some meshes may contain thousands or even millions of triangles, although the invention is not limited in this respect. Meshes may be in either two or three dimensions. When the meshes are large, it becomes more desirable to use a simplification technique that is efficient in terms of storage and processing utilization. The mesh may be represented in a data structure comprising an array of vertices, an array of edges, and an array of faces. These arrays define the model's features such as its connectivity, shape, and possibly colors and textures. In at least one embodiment, each vertex may be represented as a set of x, y, and z coordinates in a three dimensional coordinate system. In at least one embodiment, each edge may be represented as pointers or links to two vertices. In this embodiment, each face may be represented as pointers or links to three vertices. In some models, color, texture, and surface normal information for faces may also be included. The model's data structure may be input to a simplification process to produce a data structure representing a simplified multi-resolution mesh that corresponds to an original, complex mesh.

Embodiments of the present invention determine the error metric of an edge collapse operation by performing a selected edge collapse, calculating the shortest distance from each of the planes defined by the updated faces of the mesh to the position of the removed vertex, returning the maximum distance of the computed distances as the error metric for the edge collapse, and then restoring the mesh to the state before the edge collapse. This process may be repeated for all possible edge collapses for a mesh. The resulting error metrics may then be sorted to determine the edge collapse operation that will result in the least damage to the mesh. The edge collapse with the lowest error metric may then be performed to modify the mesh. These steps may be repeated iteratively to provide a multi-resolution mesh.

Figure 2:
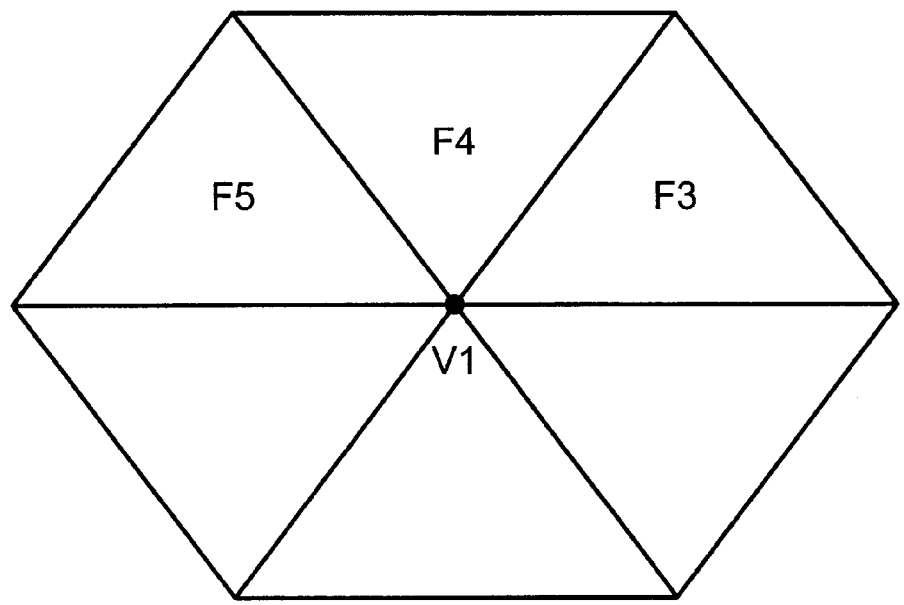
FIG. 2 is a diagram of the example mesh after one edge collapse operation.

FIG. 1 is a diagram of an example mesh prior to an edge collapse operation. In this simple example used only for purposes of explanation and not to limit the invention, two vertices, V1 and V2, are identified. These vertices, and others, define five faces, F1, F2, F3, F4, and F5. An embodiment of the present invention first selects an edge to collapse. For example, the edge defined by vertices V1 and V2 may be selected. The edge collapse operation may be performed by removing V2. FIG. 2 shows the resulting mesh after the selected edge collapse operation has been performed. Faces F1 and F2 have been removed due to the removal of V2. An embodiment of the present invention computes the shortest distance from each of the planes defined by the updated faces to the position of the removed vertex. In this example, the distance from updated F3 to V2, from updated F4 to V2, and from updated F5 to V3 may be computed. The maximum of these computed distances may be determined and returned as the error metric for this edge collapse operation. This fast and simple technique provides a good approximation of the maximum distance between the surface that existed just before the edge collapse and the surface that exists just after the edge collapse.

Figure 3:
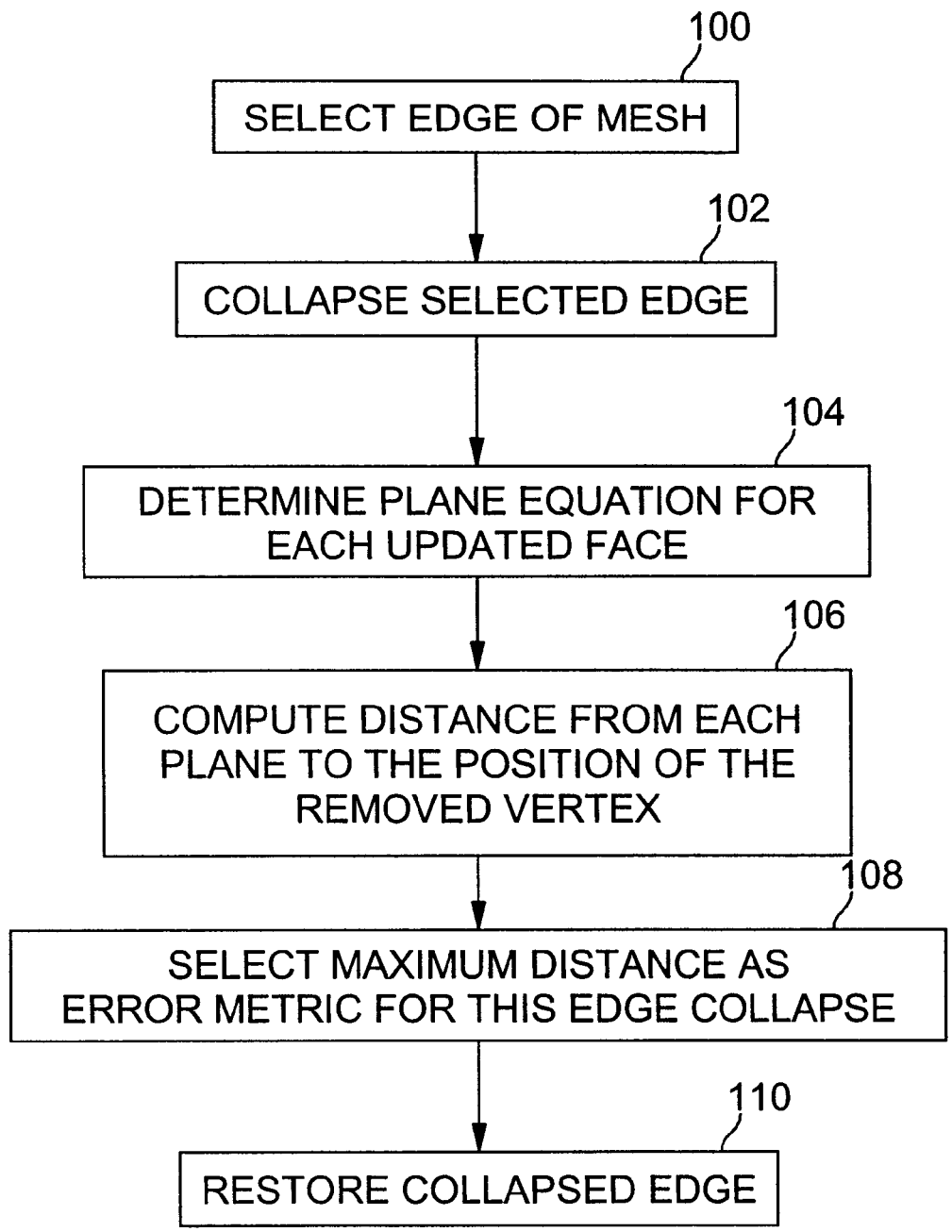
FIG. 3 is a flow diagram of determining an error metric for a mesh simplification process according to an embodiment of the present invention.

FIG. 3 is a flow diagram of determining an error metric for a mesh simplification process according to an embodiment of the present invention. Prior to performing the operations of FIG. 3, a mesh simplification system may generate a data structure for a complex mesh to represent the relationships between the vertices, edges, and faces of the mesh in a format that may be efficient for error metric processing. This data structure comprises mesh relationship information, such as which edges belong to vertices, which vertices are the end points of edges, and which vertices defines faces, for example. The data structure may also comprise information relating to color, texture, and surface normals for faces. In one embodiment, the data structure may be easily traversed when collapsing edges, yet it includes all of the original information of the complex mesh, thereby reducing overall processing time for surface simplification.

In one embodiment, the mesh simplification system comprises a view dependent adaptive mesh simplification system. A view dependent adaptive mesh simplification system may relax the strict order (from least damaging to most) of edge collapses that traditional multi-resolution mesh (MRM) simplification system imposes. The edge collapses may be performed in the order that is most optimal for the current view (e.g., fewest polygons for any desired image quality). Generally, the portion of the model that is close to the camera may be left at high resolution while parts of the model that are farther away may be reduced. To do this optimally one needs to know the size of each edge collapse (i.e., the distance measured by the error metric), so that the size of the error distance projection onto the screen can be calculated. If the error distance projects to less than a pixel, the edge can be collapsed with little to no visible impact. Projection of the error distance may be implemented as a projection of a line segment that has a length equal to the distance, with the line segment starting at the vertex that was retained during an edge collapse and extending in the direction of the surface normal for the current face.

In one embodiment of the present invention, error metric determination processing may be as follows. At block 100, one edge of the mesh may be selected. An edge collapse operation may be performed on the selected edge at block 102. Any one of several well-known edge collapse techniques may be applied, without limiting the present invention. At block 104, a plane equation for each face updated as a result of the edge collapse may be determined according to well-known mathematics. At block 106, the distances from each plane to the position of the vertex removed during the edge collapse operation may be computed according to well-known mathematics. At block 108, the maximum distance of the distances from each plane to the position of the removed vertex may be selected as the error metric for this proposed edge collapse operation. The error metric value may be used further in mesh simplification processing for selecting the next edge to collapse. At block 110, the collapsed edge may be restored to the mesh for further processing, such as determining other error metrics, for example. Blocks 100–110 may be repeated for each edge of the mesh.

After determining the error metrics for edge collapses for each edge of a mesh, the edges may be sorted according to the newly assigned costs, from a lowest cost to a highest cost, based on the potential damage to the shape of the mesh. In one embodiment, all error metrics for only a portion of the edges of the mesh may be determined. In another embodiment, error metrics for all edges of the mesh may be determined. The edges may be iteratively collapsed in the error metric cost order until a desired resolution of the model is obtained. In one embodiment, all edges may be collapsed. At any point in the iterative edge collapse process, the multi-resolution mesh may be saved for later use, thereby obtaining meshes with differing levels of detail. In one embodiment, the error metrics may be recomputed for each edge of the mesh after each iterative edge collapse operation.

Embodiments of the present invention enable graphical content developers to use a single high-resolution, three-dimensional model and at runtime extract the level of detail appropriate for the capabilities of the processor of the system being used. Application programs having such models may be more visually appealing to a user when executed on more powerful processors. The multi-resolution meshes generated by embodiments of the present invention may be used to transmit three-dimensional images over networks, such as the Internet, for example. In these cases, the lowest resolution model may be sent over the network first, followed by incremental updates that increase the resolution. The result is that the three-dimensional model being viewed in a browser program may gradually become more detailed as the download progresses.

Embodiments of the present invention may also have applications beyond the reduction of three-dimensional graphical models. Many types of data, including images, video, audio, and animation, may be represented as surfaces. Because surface simplification effectively compresses the original data by removing lesser important data, embodiments of the present invention may be applicable to the compression of these multimedia data types.

Furthermore, embodiments of the present invention provide for the measurement of the error in units that may be used to drive or otherwise control an adaptive view dependent mesh simplification system. The present invention measures error in terms of distance in model space, which can be used to drive or control a mesh simplification system that adapts to a camera's position. Model space is the coordinate system that a particular model is defined in (typically the origin of the model space is located at the center of the model). Many known error metrics in current use measure the error in a relative manner that cannot be directly used to drive an adaptive metric. The known quadric error metric is one example of this. The quadric error metric approximates the sum of the distances squared from the kept vertex to the planes in the original mesh. While the sum of distances squared can be used to rank one edge collapse as better than another, it does not provide an actual measurement of the error. To drive an adaptive simplification system, one needs a measurement of the error (such as in the present invention) that can be converted into screen space units. The present invention provides such a measurement, because it is known how to convert an error measurement in terms of distance in model space into world space distance, and then into screen space distance. The screen space distance may then be used to directly drive or control a mesh simplification system that adapts to a camera's position.

Embodiments of the present invention provide better accuracy than known quadric error metric approaches (for example, such as the quadric error metric approach as described in "Surface Simplification Using Quadric Error Metrics" by Michael Garland and Paul S. Heckbert, SIGGRAPH 97 Proceedings, August 1997, pp. 209–216). In addition, system performance may be similar to using quadric error metrics.

In the preceding description, various aspects of the present invention have been described. For purposes of explanation, specific numbers, systems and configurations were set forth in order to provide a thorough understanding of the present invention. However, it is apparent to one skilled in the art that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 4:
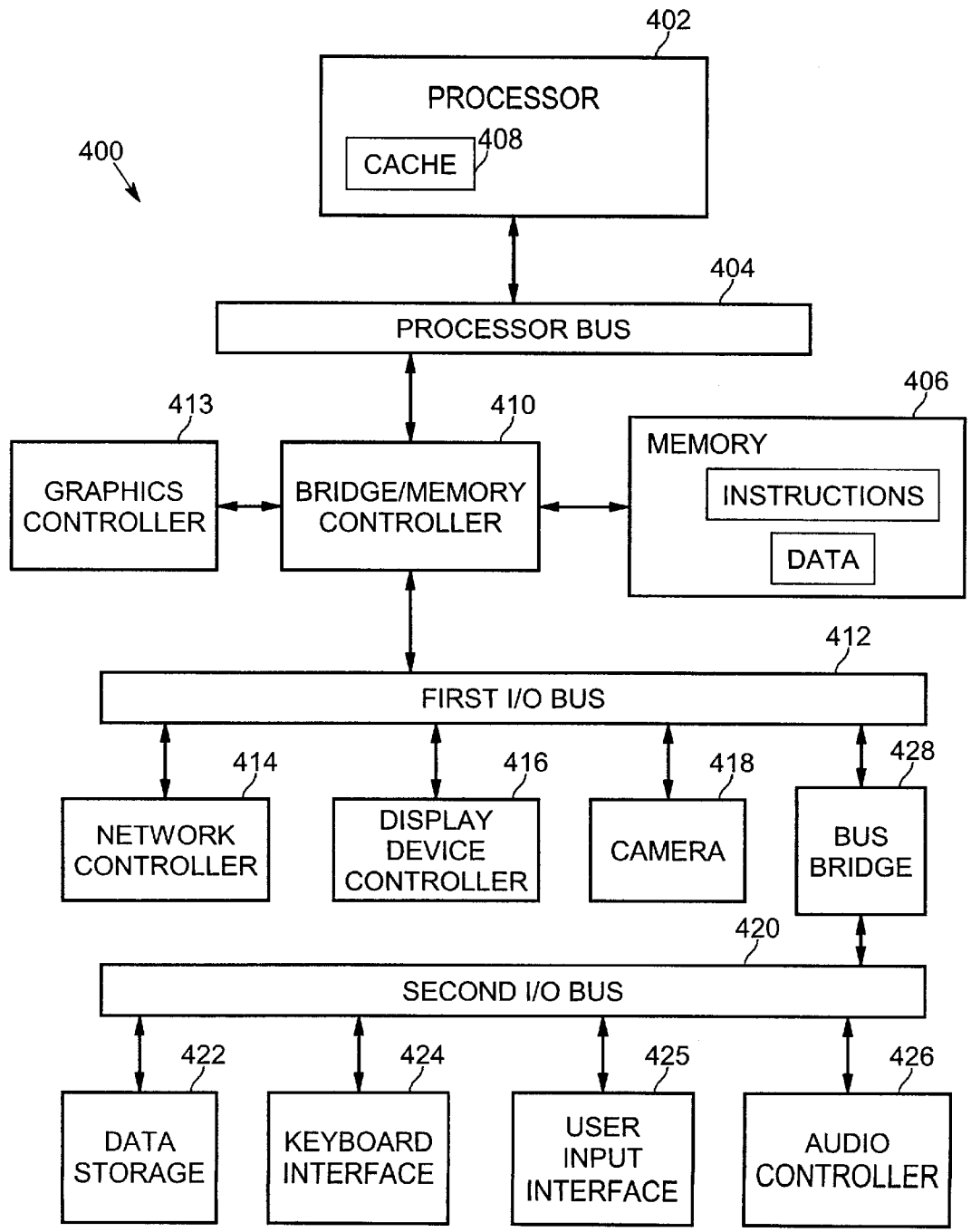
FIG. 4 is a diagram illustrating a sample system suitable to be programmed according to an embodiment of a method for determining an error metric for a mesh simplification process.

An example of one such type of processing system is shown in FIG. 4. Sample system 400 may be used, for example, to execute the processing for methods in accordance with the present invention, such as the embodiment described herein. Sample system 400 is representative of processing systems based on the PENTIUM®, PENTIUM® Pro, PENTIUM® II, and PENTIUM® III microprocessors available from Intel Corporation, although other systems (including personal computers (PCs) having other microprocessors, engineering workstations, set-top boxes and the like) may also be used. In one embodiment, sample system 400 may be executing a version of the Windows™ operating system available from Microsoft Corporation, although other operating systems and graphical user interfaces, for example, may also be used.

FIG. 4 is a block diagram of a system 400 of one embodiment of the present invention. The computer system 400 includes a processor 402 that processes data signals. The processor 402 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 4 shows an example of an embodiment of the present invention implemented as a single processor system 400. However, it is understood that embodiments of the present invention may alternatively be implemented as systems having multiple processors. Processor 402 may be coupled to a processor bus 404 that transmits data signals between processor 402 and other components in the system 400.

System 400 includes a memory 406. Memory 406 may be a dynamic random access memory (DRAM) device, a static random access memory (SRAM) device, or other memory device. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406. Cache memory 408 in this embodiment speeds up memory accesses by the processor by taking advantage of its locality of access. Alternatively, in another embodiment, the cache memory may reside external to the processor.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In some embodiments, the bridge/memory controller provides a graphics port for coupling to a graphics controller 413. In this embodiment, graphics controller 413 interfaces to a display device (not shown) for displaying images rendered or otherwise processed by the graphics controller 413 to a user. The display device may comprise a television set, a computer monitor, a flat panel display, or other suitable display device.

First I/O bus 412 may comprise a single bus or a combination of multiple buses. First I/O bus 412 provides communication links between components in system 400. A network controller 414 may be coupled to the first I/O bus 412. The network controller links system 400 to a network that may include a plurality of processing systems (not shown in FIG. 4) and supports communication among various systems. The network of processing systems may comprise a local area network (LAN), a wide area network (WAN), the Internet, or other network. In some embodiments, a display device controller 416 may be coupled to the first I/O bus 412. The display device controller 416 allows coupling of a display device to system 400 and acts as an interface between a display device (not shown) and the system. The display device may comprise a television set, a computer monitor, a flat panel display, or other suitable display device. The display device receives data signals from processor 402 through display device controller 416 and displays information contained in the data signals to a user of system 400.

In some embodiments, camera 418 may be coupled to the first I/O bus. Camera 418 may comprise a digital video camera having internal digital video capture hardware that translates a captured image into digital graphical data. The camera may comprise an analog video camera having digital video capture hardware external to the video camera for digitizing a captured image. Alternatively, camera 418 may comprise a digital still camera or an analog still camera coupled to image capture hardware. A second I/O bus 420 may comprise a single bus or a combination of multiple buses. The second I/O bus 420 provides communication links between components in system 400. A data storage device 422 may be coupled to the second I/O bus 420. The data storage device 422 may comprise a hard disk drive, a floppy disk drive, a CD-ROM device, a flash memory device, or other mass storage device. Data storage device 422 may comprise one or a plurality of the described data storage devices.

A keyboard interface 424 may be coupled to the second I/O bus 420. Keyboard interface 424 may comprise a keyboard controller or other keyboard interface device. Keyboard interface 424 may comprise a dedicated device or may reside in another device such as a bus controller or other controller device. Keyboard interface 424 allows coupling of a keyboard to system 400 and transmits data signals from a keyboard to system 400. A user input interface 425 may be coupled to the second I/O bus 420. The user input interface may be coupled to a user input device, such as a mouse, joystick, or trackball, for example, to provide input data to the computer system. Audio controller 426 may be coupled to the second I/O bus 420. Audio controller 426 operates to coordinate the recording and playback of audio signals. A bus bridge 428 couples first I/O bridge 412 to second I/O bridge 420. The bus bridge operates to buffer and bridge data signals between the first I/O bus 412 and the second I/O bus 420.

Embodiments of the present invention are related to the use of the system 400 to simplify multi-resolution models. According to one embodiment, simplifying a multi-resolution model using an error metric as described herein may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to simplify a multi-resolution model using an error metric as described herein according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions well-known in the art. In particular, data storage device 422 may be used to provide long-term storage for the executable instructions and data structures for embodiments of methods of simplifying multi-resolution models in accordance with the present invention, whereas memory 406 is used to store on a shorter term basis the executable instructions of embodiments of the methods for simplifying multi-resolution models in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of determining an error metric for simplification of a mesh comprising:
   selecting an edge of the mesh;
   performing an edge collapse operation for the selected edge;
   computing at least one distance from a plane of each updated face of the mesh to a position of a vertex removed during the edge collapse operation; and
   selecting a maximum distance of the computed distances as the error metric for the edge collapse operation for the selected edge.

2. The method of claim 1, further comprising restoring the collapsed edge to the mesh.

3. The method of claim 1, further comprising representing the maximum distance in units for controlling view dependent adaptive mesh simplification processing.

4. The method of claim 3, wherein the units comprise units in model space.

5. An article comprising: a machine accessible medium having a plurality of instructions, wherein when the instructions are executed by a processor, the instructions determine an error metric for simplification of a mesh by selecting an edge of the mesh, performing an edge collapse operation for the selected edge, computing at least one distance from a plane of each updated face of the mesh to a position of a vertex removed during the edge collapse operation, and selecting a maximum distance of the computed distances as the error metric for the edge collapse operation for the selected edge.

6. The article of claim 5, further comprising instructions for restoring the collapsed edge to the mesh.

7. The article of claim 5, further comprising instructions for representing the maximum distance in units for controlling view dependent adaptive mesh simplification processing.

8. The article of claim 7, wherein the units comprise units in model space.

9. A method of simplifying a mesh, comprising:
   determining a plurality of error metrics, each error metric determined by collapsing each of a plurality of edges of the mesh by selecting an edge of the mesh, performing an edge collapse operation for the selected edge, computing at least one distance from a plane of each updated face of the mesh to a position of a vertex removed during the edge collapse operation, selecting a maximum distance of the computed distances as the error metric for the edge collapse operation for the selected edge, and restoring the collapsed edge to the mesh;

sorting the error metrics into a first order; and performing at least one edge collapse operation on at least one edge of the mesh according to the first order.

10. The method of claim 9, further comprising representing the error metrics in units for controlling view dependent adaptive mesh simplification processing.

11. The method of claim 10, wherein the units comprise units in model space.

12. The method of claim 9, further comprising performing the edge collapse operations in the first order until a desired resolution of the mesh is obtained.

13. The method of claim 9, wherein the first order comprises an ascending order from an edge collapse operation having a least impact to the mesh to an edge collapse operation having a most impact to the mesh.

14. The method of claim 9, further comprising determining the error metrics again for all remaining edges after performing the edge collapse operation on at least one edge according to the first order.

15. An article comprising: a machine accessible medium having a plurality of instructions, wherein when the instructions are executed by a processor, the instructions simplify a mesh by determining a plurality of error metrics, each error metric determined by collapsing each of a plurality of edges of the mesh by selecting an edge of the mesh, performing an edge collapse operation for the selected edge, computing at least one distance from a plane of each updated face of the mesh to a position of a vertex removed during the edge collapse operation, selecting a maximum distance of the computed distances as the error metric for the edge collapse operation for the selected edge, and restoring the collapsed edge to the mesh;

sorting the error metrics into a first order; and performing at least one edge collapse operation on at least one edge of the mesh according to the first order.

16. The article of claim 15, further comprising instructions for representing the error metrics in units for controlling view dependent adaptive mesh simplification processing.

17. The article of claim 16, wherein the units comprise units in model space.

18. The article of claim 15, further comprising instructions for performing the edge collapse operations in the first order until a desired resolution of the mesh is obtained.

19. The article of claim 15, wherein the first order comprises an ascending order from an edge collapse operation having a least impact to the mesh to an edge collapse operation having a most impact to the mesh.

20. The article of claim 15, further comprising instructions for determining the error metrics again for all remaining edges after performing the edge collapse operation on at least one edge according to the first order.

* * * * *